June 14, 1966 B. F. LATHAM, JR 3,256,065
APPARATUS FOR MAKING CARBON BLACK
Filed Oct. 30, 1962 2 Sheets-Sheet 1

INVENTOR.
BURTON F. LATHAM JR.
BY
ATTORNEY

INVENTOR.
BURTON F. LATHAM JR.
BY
ATTORNEY

United States Patent Office 3,256,065
Patented June 14, 1966

3,256,065
APPARATUS FOR MAKING CARBON BLACK
Burton F. Latham, Jr., Houston, Tex., assignor to Continental Carbon Company, Houston, Tex., a corporation of Delaware
Filed Oct. 30, 1962, Ser. No. 234,032
5 Claims. (Cl. 23—259.5)

This invention relates to the production of rubber grade carbon blacks, especially those characterized in having high abrasion-resistant properties, by the pyrolysis of normally liquid hydrocarbons and more particularly concerns an improved apparatus for effecting the production of such blacks.

The process for producing rubber-reinforcing carbon blacks from normally liquid hydrocarbons, commonly called the oil furnace method, is very old in the art and basically involves burning the carbon-producing feed stock in a heat-insulated reactor with a deficiency of air whereby the heat generated in burning a portion of the feed stock dissociates the remainder thereof into carbon black. Thereupon, the reaction products or aerosol is suddenly cooled so as to immediately halt further reaction and black recovered therefrom. In actual commercial processes of this type, and in the apparatus to which this invention is directed, a somewhat different procedure is observed. Generally, in commercial oil furnace processes, a combustion fuel, e.g., natural gas, propane, vaporized petroleum distillates, etc., together with a sufficient amount of free oxygen containing gas, usually air, is combusted in a reactor and thereupon the normally liquid carbon-producing feed stock is injected into the resultant flame or combustion products thereof. The amount of air supplied to the reactor or furnace is usually in excess of that required for the combustion fuel, but the excess is only sufficient to combust a very minor portion of the injected feed stock.

The grade of black obtained in the above-described commercial method is primarily dependent upon the turbulency associated with the flame employed, which in turn is dependent upon the design of the furnace. In general, the particle size of the black produced is a function of said turbulency and the higher the degree of turbulency observed, the smaller will be the particle size of the black. There are two principal ways of establishing turbulent flame patterns in the present day commercial carbon black producing units wherein a generally cylindrical reactor or furnace is used. One of these ways consists of continuously establishing a centrifugal flame pattern at one end of the cylindrical furnace. In accordance with this mode, the feed stock is continuously injected axially into the vortex of the flame or the combustion products thereof. The other way consists of continuously establishing a turbulent and essentially longitudinally progressing flame at one end of the tubular reactor. In this latter method, the feed stock is continuously introduced into about the base of the resultant flame.

The main advantage of the centrifugal flame method is that it is adapted to produce carbon black at a very high rate. Also, troublesome coke deposition upon the interior surface of the reactor can be more easily controlled. The only significant disadvantage of the method is that it is fairly limited with respect to the number of grades of carbon black capable of being produced thereby. The principal advantage of the longitudinal flame method is that it is somewhat more versatile in the number of grades of carbon black that can be produced. On the other hand, the prior art apparatuses employing longitudinal flow are subject to coking up and additionally the yield of a given type and quality of carbon black obtained is less than that observed in producing a corresponding grade of black by the centrifugal flame method.

In accordance with the present invention, an improved apparatus is provided in which either the centrifugal flame or longitudinal flame method can alternately be observed in the same unit. Additionally, where the longitudinal flame method is utilized in the apparatus of this invention, coke deposition upon the side walls of the reactor is virtually non-existent and more surprisingly, the yield of carbon black realized is significantly better than that obtained in the prior devices utilizing longitudinal flame patterns, and as a matter of fact, almost approaches the yields realized in the practice of the centrifugal flame process.

The advantages enumerated above are primarily realized by employing a Venturi section in a tubular carbon black reactor and in this connection the term tubular carbon black reactor contemplates that part of the carbon black producing unit in which pyrolysis of the feed stock is initiated and essentially consummated. It is appreciated that the art has heretofore taught the use of Venturis in carbon black furnaces, but even the most relevant of such art does not provide an insight as to the cooperative arrangement of other necessary elements of the furnace with respect to the Venturi section whereby the particularly beneficial features of the present invention are otbained.

An object of this invention is to provide a carbon black producing apparatus which is versatilely adapted for practicing either the centrifugal flame or longitudinal flame oil black process.

Another object is to provide an oil black furnace designed for employing the centrifugal flame process whereby high abrasion-resistant type blacks exhibiting improved structure characteristics can be prepared.

A still further object is to provide an oil black furnace designed for utilizing the longitudinal flame process whereby improved yields of rubber reinforcing grades of carbon black can be obtained.

These and other objects will be more completely understood by those skilled in the art upon consideration of the detailed description of the invention as set forth below.

As indicated above, the design of the furnace apart from the tubular reactor having a Venturi section is important in realizing the aforementioned advantages and objectives of this invention. A suitable overall reactor design for implementing the present invention corresponds in main to the apparatus disclosed and claimed in U.S. application Serial No. 32,688, filed May 31, 1960, now Patent No. 3,087,796. Such a reactor is essentially an all-metal one wherein the pyrolysis reaction is carried out in a metallic reactor tube lined with a heat-conducting layer of refractory and wherein the combustion air is beneficially pre-heated by initially flowing same about the outer surface of the reactor tube. A salient feature of this apparatus, particularly with respect to the implementation of the various embodiments of this invention, is its relative simplicity of construction. In spite of the high temperatures encountered in the operation of such a furnace, the design permits the unit to be shut down, cooled and disassembled in but a minute fraction of the time required to similarly service virtually all other prior art apparatuses which are for the most part massively lined with refractories and insulating materials. As will be seen, the above-mentioned apparatus can be conveniently and simply modified so as to permit the practice of either the centrifugal flame or longitudinal flame process.

The present invention, then, comprises the novel features generally outlined hereinabove and which now will be fully described with reference to the illustrative embodiments shown in the accompanying drawings in which.

Figure 1:
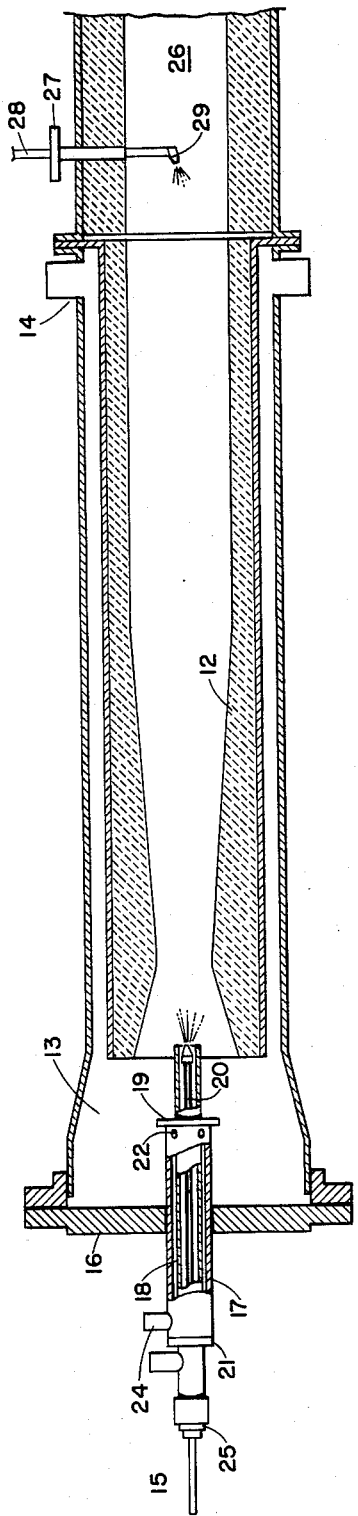
FIGURE 1 is a longitudinal elevation illustrating the general form of a carbon black furnace embodying the teachings of this present invention, in combination with a fuel burner-feed stock injection assembly, said assembly being shown partly cut away for emphasis of construction details.

Referring to the drawings and particularly to FIG. 1 thereof, the numeral 10 designates an elongate metallic housing or shell which comprises the outer jacket of the apparatus of the present invention. Concentrically disposed within housing 10 is an elongate metallic tube or reactor tube 11 of lesser diameter than that of the housing. The metallic tube 11 can be suitably supported within the housing by means of a plurality of spacer rods (not shown) welded onto its outer surface. Elongate tube 11 is provided with a lining of refractory 12, said lining being preferably fabricated from a material having a relatively high heat transfer co-efficient. The refractory lining 12 is also desirably of minimum thickness throughout the major portion of elongate tube 11, such thickness being adapted, however, to protect tube 11 under operating conditions for an extended period of time. A suitable nominal thickness of the liner depends principally upon the mechanical strength properties of the refractory used. Thus, a material such as silica carbide, can be utilized in thicknesses ranging from about ½–¼ inch and even less. Other suitable liners can be molded in place, employing conventional castable refractory compositions. For example, castable Kaolin-based refractories can be used in this manner. When employing the castable type of refractory lining, it is generally desirable to employ greater thicknesses thereof than mentioned in connection with the use of a liner of silica carbide. By so doing, one can reinforce the castable type liner with wire mesh and similar reinforcers so as to improve its structural integrity. However, a 2-inch thick liner of a castable refractory of the type specifically mentioned within a 14-inch diameter metallic reactor tube has been successfully employed without reinforcements and at the same time has provided a satisfactory degree of heat transfer capability.

Disposed within and toward the upstream opening of reactor tube is a Venturi configuration which can be shaped from the same refractory material employed to line the tube. This provision, of course, will necessitate using greater thicknesses of refractory lining at this portion than previously indicated, but as will be explained hereinbelow, the Venturi section constitutes but a minor portion of the entire length of reactor tube 11 and consequently the overall degree of heat transfer effected will not be markedly altered by this relatively thick section of refractory lining. As a matter of fact, the thickness of the refractory at this part of the tube, i.e., over and above the nominal thickness of liner employed, is highly advantageous inasmuch as maximum temperatures are developed during the course of the reaction in this area.

The corresponding downstream ends of the outer housing or shell 10 and elongate tube 11 are arranged in substantially flush alignment. The outer housing 10 can take the form of a standard steel tube and the length thereof should be sufficiently greater than that of the elongate tube 11 so as to project several feet beyond the upstream end of the latter, thereby providing a generally cylindrical chamber 13 substantially unobstructed except for certain appurtenances disposed therein, the function of which will be described hereinafter. As shown in FIG. 1, the part of housing 10 extending beyond the upstream end of reactor tube 11 is preferably flared for at least a substantial portion of the length thereof.

As for specific measurements of the elements described directly hereinabove, the outer shell 10 can acceptedly vary between 10 and 15 feet in length and that of the reactor tube 11 can suitably be about two to three feet less than the length selected for the shell member. A suitable nominal diameter for the outer shell 10 can be 18-inches with the inner elongate tube 11 being from about 10- to 14-inches in diameter and also of standard steel composition.

The throat of the Venturi is disposed downstream from the upstream opening of elongate tube 11. Employing a reactor tube having a length in the order of that specifically indicated above, the throat of the Venturi can be spaced about six-inches to three feet, and even somewhat more, from the upstream opening of said tube. The cross-sectional area of the throat can range from about 20 percent to 90 percent, and more preferably, from 30 percent to 50 percent of that of the nominal cross-sectional area of the reactor tube, for example, the circular cross-sectional area of the lined downstream opening thereof. Suitable convergent and divergent angles for the Venturi configuration (measured with respect to the longitudinal axis of the reactor tube) are from about 7° to 15° and 4° or less, respectively.

In FIG. 1, free oxygen containing gas, as for example atmospheric air, is introduced into air inlet 14 near the downstream end of housing 10 to be circulated in the annular spacing between said housing and the inner tube 11. The air introduced into the annual spacing flows in the general direction of the upstream extremity of the annular spacing and thence into chamber 13 where it mixes with fuel gas introduced at this point as will be more fully explained hereinbelow.

The fuel burner and hydrocarbon injection assembly is generally depicted at 15 in FIG. 1 and is shown extending through end wall 16 forming a closure member for the upstream extremity of the housing 10. More specifically, the burner-feed stock injection assembly comprises a tube 17 extending through cover member 16 substantially axially and rigidly attached thereto by a suitable means (not shown) such as a packing gland. A tube 18 is disposed concentrically within tube 17 and extends into the cylindrical chamber 13, preferably beyond the extremity of the tube 17. A vertically disposed apertured disc or circular plate 19 serves as a closure member for the annular spacing formed by the tubes 17 and 18 at the extremity of said spacing disposed within chamber 13 and is rigidly attached to said tubes by welding. The purpose of disc 19 is to prevent blowout of the flame under operating conditions. The disc 19 has a diameter substantially greater than the outside diameter of the tube 17 but substantially less than the diameter of the upstream opening of the refractory lined elongate tube 11.

Concentrically mounted by means of spacers (not shown) within tube 18 is a liquid hydrocarbon supply pipe 20 which terminates at a point approximately flush with the corresponding extremity of tube 18. Immediately behind disc 19 are provided a plurality of radially oriented apertures 22 through tube 17 communicating with the annular space formed by the said tube and tube 18. The end of pipe 20 disposed within the furnace can be equipped with a spray nozzle or left open if a vaporizable type of feed stock is employed. The other (and externally projecting) extremity of tube 17 is provided with an annular closure member 21. Combustion gas is supplied to the apertures 22 through the gas inlet connection 24. Rearwardly of the annular closure member 21 is provided an air connection similar in construction as gas inlet connection 24 through which air is introduced into the annular air chamber formed by the inner surface of tube 18 and outer surface of the oil supply pipe 20; said annular chamber being provided with external closure member 25. The axial air flowing about the oil supply pipe 20 forms a concentrated stream about the feed stock emanating from supply pipe 20 and thereby aids in directing the injected feed stock down the center of inner tube 11. Additionally, where a spray nozzle is employed, said axial air prevents coke from forming on the nozzle tip to the degree whereby its spraying capacity is impaired.

The carbon producing feed stock is injected into the furnace in a manner whereby substantially no dissociation thereof occurs within chamber 13. It is also contemplated that the point of feed stock injection be upstream from the throat portion of the Venturi configuration. A particularly suitable situs for introducing the feed stock, especially when using a Venturi whose convergent section is short, i.e., from about ½ to 1½ feet in length, is at about the upstream opening of the inner tube 11. Where the length of the convergent section is or exceeds the maximum of the range just stated, the feedstock can advantageously be introduced within the reactor tube.

Communicating with the downstream end of the refractory lined inner tube 11 is a quench section of which a fragmentary section is shown at 26 in FIG. 1. The quench section can suitably take the form of a cylindrical metallic tube having an outside diameter corresponding to that of the housing 10 and provided with a sufficient thickness of refractory or a combination of refractory and insulation layers so that the inner diameter thereof is essentially the same as that of the refractory lined inner tube 11 at the latter's downstream end. The quench tube can be connected to the outer shell 10 by means of a flange associated with the inner tube 11 as shown in the drawing, which flange also serves as a closure member for the downstream extremity of the annular spacing formed by housing 10 and the inner tube 11. The various connections to the flange can be accomplished by welding or bolting. The quench section 26 is provided with a radial spray port 27 through which there extends a water pipe 28, the latter terminating adjacent the center line of the quench section and being provided with a spray head 29 which is directed toward the upstream end of the furnace.

In operation of the furnace shown in FIG. 1, the combustion air enters into the annular spacing formed by shell 10 and inner tube 11 near the downstream extremity of these elements and is forced in the general direction of the upstream extremity of said annular spacing. The pre-heated air enters into chamber 13 and mixes with the fuel gas discharged by the above-described burner. This combustible mixture commences to burn within chamber 13 and the resultant flame progresses into inner tube 11 and reaches its maximum state of turbulency and temperature at the throat section of the Venturi. The aerosol then flows toward the downstream end of the furnace where it is shock-cooled by the water spray so as to halt further reaction and to lower the temperature of the effluent so that same can be handled in a carbon black recovery system.

Figure 2:
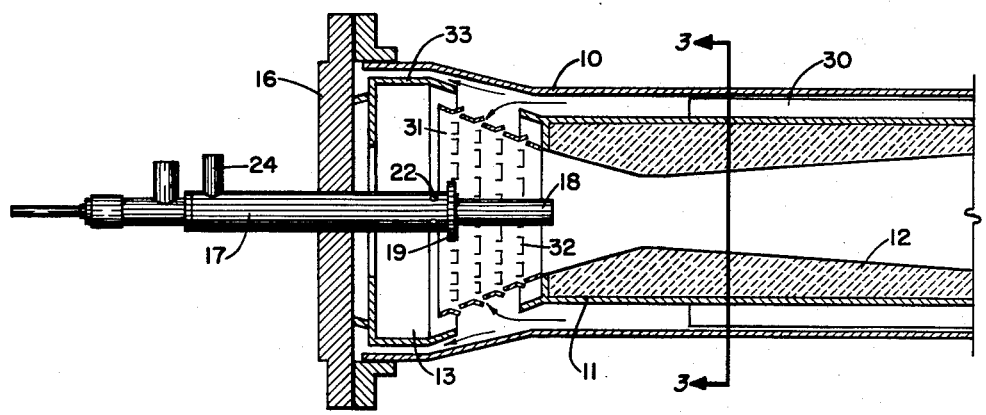
FIGURE 2 is a fragmentary longitudinal elevation, illustrating an embodiment of this invention.
Figure 3:
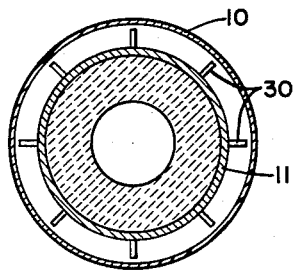
FIGURE 3 is a sectional view taken on the line 3—3 of FIG. 1.

FIGURE 2 illustrates a modification of the furnace generally depicted in FIG. 1 and one primarily adapted for producing carbon black by the longitudinal flame process. In this embodiment the longitudinal flame pattern is achieved by effecting longitudinal flow for the air passing through the annular pre-heat spacing formed by the outer surface of the reactor tube 11 and the encasing portion of the housing 10. The combustion air is introduced into said annular spacing at the downstream extremity thereof as described in connection with FIG. 1 and forced under pressure toward the upstream portion of the furnace, i.e., the generally cylindrical chamber 13. In order to assure a longitudinal flow pattern for the combustion air, there is provided a plurality of vanes 30 about the outer surface of the reactor tube 11, said vanes suitably being rectangular strips having a width slightly less than that of the cross-sectional width of the annular spacing so as to allow for the expansion that will be experienced under operating conditions. The air guiding vanes can be of a length ranging from about 2 to 4 feet in length and are attached perpendicularly to the outer surface of the reactor tube or similarly mounted on a thin sleeve whose diameter will snugly accommodate the reactor tube. When employed in this manner, the air guiding vanes serve additionally as a support, thus maintaining the upstream end of the reactor tube 11 concentrically disposed within the housing 10. A plurality of guiding vanes are desirably used and as shown in FIG. 3, eight of such vanes equi-spaced can be advantageously employed. The air guiding vanes are located near the upstream end of the annular spacing. The upstream edges of the vanes can be located near the corresponding extremity of the annular spacing or can be spaced downstream therefrom as shown in FIG. 2.

Disposed within cylindrical chamber 13 is a combustion aid device, generally indicated at 31; the same being a metallic frusto-cone with its smaller end connected to the adjacent end of reactor tube 11. The frusto-cone can be fabricated from heat-resistant sheet metal such as 22 gauge No. 309 stainless steel. The outer surface of the combustion aid device is provided with a plurality of louver rows 32 arranged in concentric rings with each louver disposed approximately perpendicularly with respect to the longitudinal movement of the combustion air.

Within the generally cylindrical chamber 13, and in axial alignment with the combustion aid device 31, is a horizontally disposed heat shield 33 which may be acceptably fabricated from 10 gauge No. 309 stainless steel. This horizontally disposed heat shield is shaped so as to provide an annular rim concentric with and adjacently spaced from housing 10. The vertically disposed base of the heat shield is supported by the closure member 16 and is adjacently spaced therefrom. The base of the heat shield is also provided with a sizable center opening so as to accommodate the fuel burner-feed stock assembly and additionally to permit the combustion air passing behind the heat shield to reverse direction and pass therethrough. This heat shield serves to protect the closure member 16 and the adjacent portion of the outer housing 10 from radiated heat. By virtue of the heat shield's design, a certain amount of the combustion air will flow contiguous to the wall of the cylindrical chamber 13 and exit into the chamber from behind the base of the heat shield through the opening provided therein as described. This minor but constant flow of combustion air effectively insulates the outer portion of the cylindrical chamber and the closure member 16 from the extreme temperatures developed in this portion of the furnace. The amount of insulating air can be increased by providing the outside extremity of the upstream end of the inner tube with a narrow lip as shown in FIG. 2.

The operation of the apparatus depicted in FIG. 2 essentially corresponds to that described in connection with FIG. 1 except that there has been provided in the former modification the air guiding provision which assures that the flame pattern established within the reactor tube progresses downstream in a substantially longitudinal fashion. This embodiment also contemplates the use of a fuel burner arrangement identical with that shown in FIG. 1. The manner of injecting the feed stock described in connection with FIG. 1 is also contemplated in this embodiment.

Figure 4:
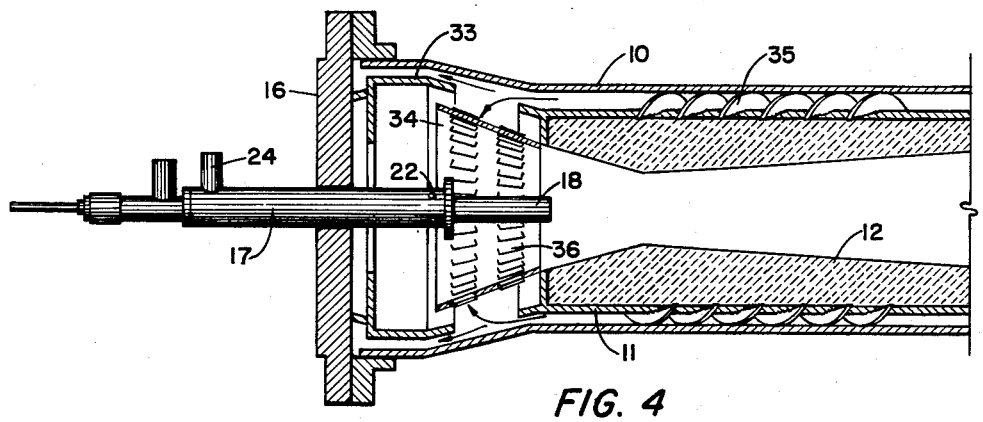
FIGURE 4 is a fragmentary longitudinal elevation, partly in section, illustrating a still further embodiment of the present invention.

FIGURE 4 illustrates an apparatus adapted for producing carbon black by means of the centrifugal flame process. With the exception of the combustion aid device generally depicted therein at 34 and the air guiding means, that is, the section of the air turning vanes shown at 35, the combination of other elements is identical with those similarly numbered in FIG. 2 and consequently, the design and function of these like elements will not be repeated.

The guiding means shown at 35 comprises a plurality of parallelly-spaced helicoid strips, each having a width corresponding to about that of the cross-sectional width of the annular spacing formed between outer shell 10 and the elongate reactor tube 11 and disposed perpendicularly about the peripheral surface of the latter. Advantageously, this section of air turning vanes is mounted as indicated at a location somewhat removed longitudinally from the upstream end opening of the reactor tube 11. In this manner, any tendency for the air to enter chamber 13 or impinge upon the combustion aid device 34 in a channeling fashion is substantially obviated. Any number of vanes can be used and the pitch thereof can also be varied in order to obtain the degree of spiraling or swirling action desired. The vanes can be affixed in a number of suitable ways such as, for example, welding to the inner tube 11, mounting on a circular band which in turn is slipped over the reactor tube, etc.

When employing a section of air turning vanes such as shown in FIG. 4, it is particularly preferred that the combination be initially introduced into the annular passageway tangentially. It is also incidentally mentioned that the combustion air can, if desired, be introduced tangentially in the embodiment illustrated in FIG. 2 since the use of the particular type of air guiding means illustrated therein will satisfactorily change the flow pattern of such introduced air from a helical to a longitudinal movement.

The combustion aid device 34 is positioned and mounted within cylindrical chamber 13 identically as described for the combustion aid device shown in FIG. 2. Combustion aid device 34 is also provided with a plurality of rows of louvers 36, but the louvers are oriented so as to form scoop-like extensions with respect to the helical flow of air impinging thereon. The louvers can acceptably be about 2-inches long, ¼ to ½-inch wide for an apparatus of the size generally described herein.

In the operation of the embodiment shown in FIG. 4, the pre-heated combustion air flowing within the annular spacing formed by the outer shell 10 and the inner reactor tube 11 leaves the section of air turning vanes 35 in a helical fashion and the major portion thereof discharges into cylindrical chamber 13 in an inwardly spiraling manner. Therein the combustion air turbulently mixes with the fuel jetted from the radially disposed burner apertures and the resultant combustible mixture proceeds to progress helically through the refractory-lined reactor tube 11. The turbulent mixture of fuel gas and air commences to burn within chamber 13; however, because of the spaced relationship of the Venturi with respect to that of the cylindrical chamber 13, maximum temperatures are not developed until about the throat section of the Venturi.

While there has been shown and described certain illustrative embodiments of this invention hereinbefore, it is to be understood that the invention is not to be limited thereto, since various other modifications can be made by those skilled in the art without departing from the spirit thereof.

What is claimed is:

1. An apparatus for producing carbon black which comprises:
 (a) an elongate tubular metallic housing having a downstream end and an upstream end, the latter being provided with a closure member;
 (b) an open elongate tubular metallic reactor of lesser diameter and length than said housing supported substantially concentrically therein with the corresponding downstream ends of the reactor and housing arranged in substantial flush alignment thereby providing an annular spacing about the reactor tube for the length thereof and a generally cylindrical chamber having a length substantially less than that of the reactor between the corresponding upstream ends of the reactor and housing;
 (c) a heat-conducting refractory means lining the reactor, said means shaped to provide a Venturi configuration whose throat section is disposed toward the upstream end of the reactor and whose overall length of convergent, throat and divergent sections is substantially less than that of the reactor;
 (d) air input means disposed toward the downstream end of said housing and adapted to force air through said annular spacing into said chamber;
 (e) a fuel burner substantially concentrically disposed within said chamber; and
 (f) a concentrically disposed carbon black producing feedstock injection means positioned within said reactor upstream with respect to the throat of said Venturi configuration.

2. An apparatus in accordance with claim 1 having an air guiding means positioned within said annular spacing, said air guiding means adapted to impart a generally inwardly spiraling motion to the air flowing therethrough into said chamber.

3. An apparatus in accordance with claim 2 wherein said air guiding means comprises a plurality of parallelly-spaced helicoid strips each having a width corresponding to about that of the cross-sectional width of said annular spacing disposed perpendicularly about the peripheral surface of said reactor.

4. An apparatus in accordance with claim 1 having an air guiding means longitudinally positioned within said annular spacing adapted to effect axial flow of the air passing through the annular spacing at the upstream extremity thereof.

5. An apparatus in accordance with claim 4 wherein said air guiding means comprises a section of a plurality of parallelly-spaced rectangular strips each having a width corresponding to about that of the cross-sectional width of said annular spacing disposed perpendicularly about the peripheral surface of the reactor tube.

References Cited by the Examiner

UNITED STATES PATENTS

| 2,368,827 | 2/1945 | Hansen et al. | 23—259.5 |
| 2,790,838 | 4/1957 | Schrader. | |
| 2,851,337 | 9/1958 | Heller | 23—209.4 |
| 2,905,731 | 9/1959 | Seed. | |
| 2,976,128 | 3/1961 | Latham et al. | 23—259.5 |
| 3,005,689 | 10/1961 | Ruble | 23—259.4 |
| 3,060,004 | 10/1962 | Whitsel | 23—259.4 |
| 3,102,790 | 9/1963 | Perry | 23—259.5 |
| 3,116,114 | 12/1963 | Gunnell | 23—209.4 |

FOREIGN PATENTS

| 569,418 | 1/1959 | Canada. |
| 840,504 | 7/1960 | Great Britain. |

MORRIS O. WOLK, *Primary Examiner.*

MAURICE A. BRINDISI, DELBERT E. GANTZ,
*Examiners.*

E. MEROS, J. H. TAYMAN, *Assistant Examiners.*